(12) United States Patent
Sato et al.

(10) Patent No.: US 6,745,790 B2
(45) Date of Patent: Jun. 8, 2004

(54) ELECTROMAGNETIC VALVE

(75) Inventors: Hedeharu Sato, Tsukuba-gun (JP); Yoshio Aso, Tsukuba-gun (JP); Shinichi Yoshimura, Tsukuba-gun (JP); Takumi Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 58 days.

(21) Appl. No.: 10/224,609

(22) Filed: Aug. 21, 2002

(65) Prior Publication Data

US 2003/0041909 A1 Mar. 6, 2003

(30) Foreign Application Priority Data

Sep. 4, 2001 (JP) ........................................ 2001-267480

(51) Int. Cl.[7] .............................................. F15B 13/044
(52) U.S. Cl. .............................. 137/315.03; 137/625.65; 251/129.15
(58) Field of Search ....................... 137/315.03, 625.65; 251/129.15

(56) References Cited

U.S. PATENT DOCUMENTS 3,661,183 A    5/1972   Komaroff et al.
5,911,400 A    6/1999   Niethammer et al.

FOREIGN PATENT DOCUMENTS

| DE | 199 56 160 | 5/2001 |
| EP | 1 008 790  | 6/2000 |
| JP | 6-71980    | 10/1994 |

*Primary Examiner*—Gerald A. Michalsky
(74) *Attorney, Agent, or Firm*—Oblon, Spivak, McClelland, Maier & Neustadt, P.C.

(57) ABSTRACT

An electromagnetic valve having a high coupling strength between a valve portion and a solenoid portion is secured at a low cost without large-sizing the solenoid portion. Recessed portions positioned on one end side of a valve body and having inner wall faces formed by inclining faces that incline from the one end side of the valve body to the other end side towards its depth are provided on a valve body side face positioned on one end side of the valve body to be opposed to each other. Cuttings for forming caulking pieces are positioned corresponding to the recessed portions on the side wall on an opening side of a magnetic case. The valve and solenoid portions are coupled such that they are biased in directions they are fitted to each other by abutting the caulking pieces on the inclining faces to caulk them in the recessed portions

5 Claims, 5 Drawing Sheets

ELECTROMAGNETIC VALVE

TECHNICAL FIELD

The present invention relates to an electromagnetic valve comprising a solenoid portion and a valve portion, and in particular to an electromagnetic valve having constitution suitable for small-sizing.

PRIOR ART

Conventionally, as an electromagnetic valve of this kind, one disclosed in JU-A 06-071980 has been known. The electromagnetic valve is constituted by a solenoid portion provided in a cover whose one end is opened and a magnetic flame with a bobbin on which a coil has been wound, a fixed iron core mounted to a central hole of the bobbin, a magnetic plate arranged on one side of the bobbin, a movable iron core inserted slidably in the central hole of the bobbin and the central hole of the magnetic plate, and a return spring returns the movable iron core to its original position, and a valve portion provided in a valve main body with a plurality of ports, a valve seat in a passage causing these ports to communicate with one another, and valve body driven by the movable iron core to open/close the valve seat, where the solenoid portion and the valve portion are coupled relative to each other by causing a claw portion provided in a projecting manner on a side wall of the valve portion and an engagement window provided in a penetrating manner on a side of an opening of the cover to be engaged with each other and causing the resilient force due to a leaf spring provided on a bottom side of the magnetic frame to act on the engaged portion of the claw and the window.

DISCLOSURE OF THE INVENTION

However, since the above-described conventional electromagnetic valve requires a complicated structure where the resilient force due to the leaf spring is caused to act on the engaged portion of the claw portion and the engagement window for coupling the solenoid portion and the valve portion, it is entirely large-sized and a cost is increased. In addition, since, simultaneously with assembling of the solenoid portion, assembling to the valve portion is performed, there is a problem that consideration for performing simultaneous and accurate assembling works is required.

That is, assembling and manufacturing must be performed so as to maintain a relatively accurate positional relationship between the movable iron core in the solenoid portion and a portion to be driven in the valve portion. For this reason, it is necessary to perform assembling of the solenoid portion itself with a high accuracy and simultaneously perform positioning between the solenoid portion and the valve portion stably and accurately, and it is also necessary to obtain a sufficient coupling strength in a simple structure. However, since there are the above-described problems in the above-described conventional electromagnetic valve, it is desirable to provide means which can further simplify the structure of the solenoid and can perform assembling and coupling of the solenoid portion to the valve portion more simply and more stably.

The present invention has been made in view of the above-described problem, and an object thereof is to provide an electromagnetic valve where the structure of a solenoid portion is further simplified and assembling and coupling of the solenoid portion to a valve portion can be performed more simply and more stably.

Also, another object of the present invention is to provide an electromagnetic valve where a coupling strength of a valve portion and a solenoid portion can be secured simply at a low cost without large-sizing the solenoid portion.

In order to achieve the above-described object, an electromagnetic valve according to the present invention is an electromagnetic valve which comprises a solenoid portion where a movable iron core driven by excitation operation to a coil is provided in a magnetic case having an opening at one end and a valve portion where a valve body which is driven by the movable iron core to switch flow paths among a plurality of ports is provided in a valve body, and where the solenoid portion and the movable iron core are coupled to each other by fitting one end side of the valve body into the opening of the magnetic case, characterized in that recessed portions for engagement are provided on opposing side faces of the valve body on the side of a connection end of the valve body with the solenoid portion and inner wall faces of the recessed portions on the side of the solenoid portion are formed in an inclining face from the solenoid portion side to the other end side thereof towards a depth direction, and on the other hand, cuttings applied for forming caulking pieces are formed on a side wall of the magnetic case positioned on the side of the opening at positions corresponding to the recessed portions, and the valve portion and the solenoid portion are coupled to each other in a state that the valve portion and the solenoid portion have been biased in a direction in which they are fitted to each other by causing the caulking pieces to abut on the inclining faces of the recessed portions to caulk the caulking pieces into the recessed portions.

In the above-described electromagnetic valve, it is desirable to constitute the solenoid portion by positioning a magnetic plate to the magnetic case such that a distance between a magnetic pole face of a fixed magnetic pole member which attracts the movable iron core by a magnetic force which is formed in the magnetic case and a face of a magnetic plate which is positioned on the side of the opening of the magnetic case is fixed and fixing the magnetic plate to the side wall of the magnetic case.

In the above-described electromagnetic valve, such a constitution can be employ that the cutting provided on the side wall of the magnetic case is formed in a U-shape opened to the side of the opening end of the side wall and a region surrounded by the cutting with the U-shape is caulked into the recessed portion as the caulking piece; the cutting is formed in a straight line shape parallel with the opening end of the side wall of the magnetic case and a region positioned between the cutting with the straight line shape and the opening end of the magnetic case is caulked into the recessed portion as the caulking piece; and the cutting is formed in a thin hole bored in parallel with the opening end of the magnetic case and a region positioned between the thin hole and the opening end of the magnetic case is caulked into the recessed portion as the caulking piece.

In the electromagnetic valve having the above-described constitution, since the valve portion and the solenoid portion are coupled in a state where they have been biased in directions in which they are fitted to each other by providing a recessed portion for engagement on the opposing face of the valve body, forming an inner wall face of the recessed portion positioned on the solenoid portion side in an inclining face inclined from the solenoid portion side to the other end side towards the depth direction, while forming a caulking piece at a portion of the magnetic case corresponding to the recessed portion and causing the caulking piece to abut on the inclining face of the recessed portion to caulk it therein, the structure of the solenoid portion is further simplified as that of the conventional example, and coupling of the solenoid to the valve portion can be performed more simply and more stably. In addition, the coupling strength can be secured simply at a low cost without large-sizing the solenoid portion.

In particular, when the solenoid portion is constituted by positioning the magnetic plate to the magnetic case in the state where the fixed iron core is pressure-contacted to the inner end of the magnetic case such that the distance between the end face of the fixed iron core on the side of the movable iron core and the face of the magnetic plate positioned on the opening side of the magnetic case is fixed and fixing the magnetic plate to the side wall of the magnetic case, assembling of the solenoid portion itself can be performed with a high accuracy and simultaneously positioning between the solenoid portion and the valve portion can be performed stably and accurately.

BRIEF DESCRIPTION OF THE INVENTION

From FIGS. 2(a) to 2(c) are sectional views for explaining steps for assembling a solenoid portion in the first embodiment of the electromagnetic valve according to the present invention.

DETAILED DESCRIPTION

Embodiments of an electromagnetic valve according to the present invention will be explained below in detail with reference to the drawings.

Figure 1A:
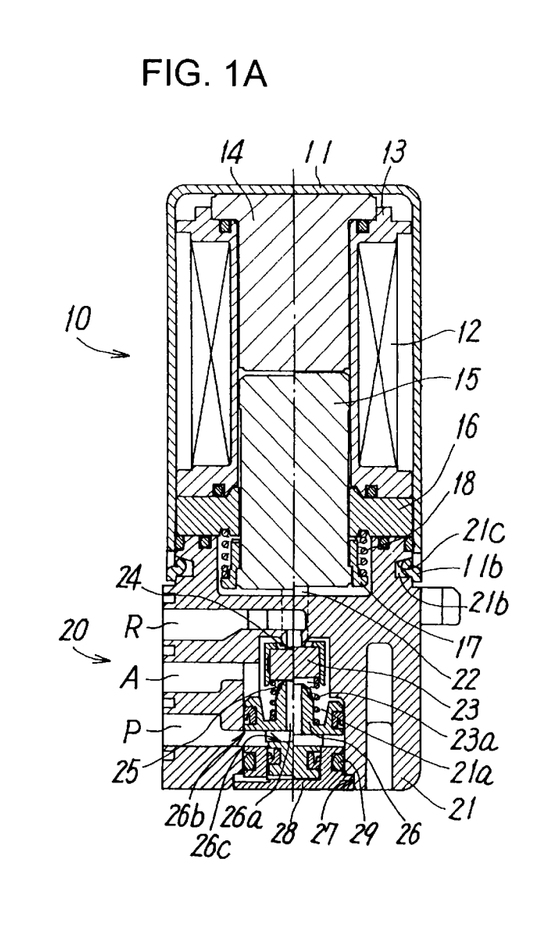
FIGS. 1(a) to 1(c) show a first embodiment of an electromagnetic valve according to the present invention, FIG. 1(a) being a longitudinal sectional view on which a left half shows a state at a time of de-excitation to a coil and a right half shows a state at a time of excitation to the coil, FIG. 1(b) being a side view, and FIG. 1(c) being an enlarged partial sectional view of a caulking portion.
Figure 1B:
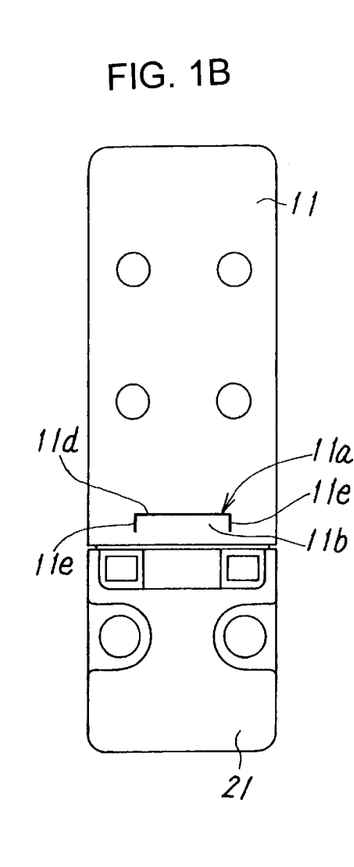
Figure 1C:
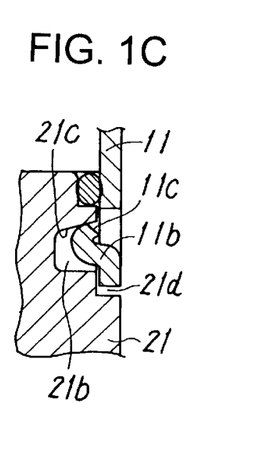

An electromagnetic valve shown in FIGS. 1(a) to 1(c) is directed to a first embodiment, and it comprises a solenoid portion 10 and a valve portion 20.

The solenoid portion 10 is constituted by a bobbin 13 on which a coil 12 has been wound, a magnetic case 11 which comprises a side wall with a generally rectangular cross-sectional shape provided around the coil 12 and an end wall formed integrally with the side wall and which has opening at its one end, a magnetic plate 16 which is disposed to the bobbin 13 on the side of the opening of the magnetic plate 11, a movable iron core 15 which is formed in a column shape with a generally oval or elliptic sectional shape and whose one end is fitted from the magnetic plate 16 side slidably into a central hole penetrating the magnetic plate 16 and the bobbin 13, and a fixed iron core 14 (a fixed magnetic pole member) which is formed in a column shape with a generally oval or elliptic sectional shape, which is disposed on an end face of the magnetic case 11 to be inserted in the central hole of the bobbin 13, and which is provided with an end face attracting one end side of the movable iron core 15 by a magnetic force, i.e., a magnetic pole face. The bobbin 13 and the fixed iron core 14 are fixed in the magnetic case 11 by fixing an outer periphery of the magnetic plate 16 to the side wall of the magnetic case 11 by means of welding or the like.

Thereby, a magnetic path is formed around the coil 12 of the bobbin 13. Also, a stopper 17 which is made from synthetic resin and which abuts on the magnetic plate 16 when the movable iron core 15 is attracted to the fixed iron core 14 is press-fitted into the movable iron core 14 on its valve portion side, and a return spring 18 is confined between a flange portion at a periphery of the stopper 17 and the magnetic plate 16.

In the solenoid portion, when the coil 12 is put in a de-excited state, as shown on a left half in FIG. 1(a), the movable iron core 14 is moved by a biasing force of the return spring 18 in a direction of separating from the fixed iron core 14 or in a direction of pushing a push rod 22 of the valve portion 20 described later. On the other hand, when the coil 12 is excited, as shown on a right half in FIG. 1(a), the movable iron core 15 is attracted to the fixed iron core 14 against the biasing force of the return spring 18 by a magnetic force so that the pushing force of the movable iron core 15 to the push rod 22 is released.

Figure 2A:
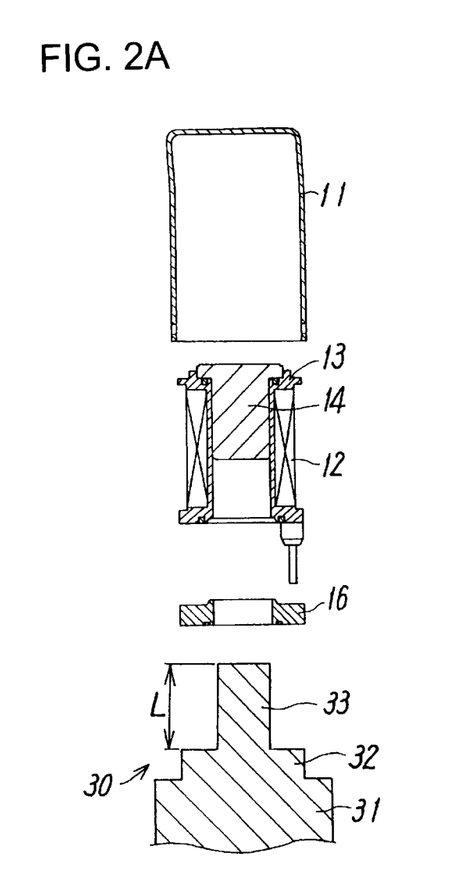
Figure 2B:
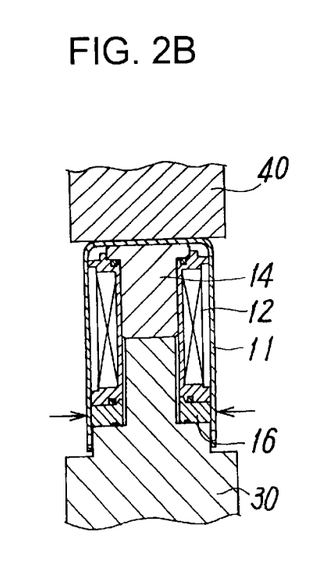
Figure 2C:
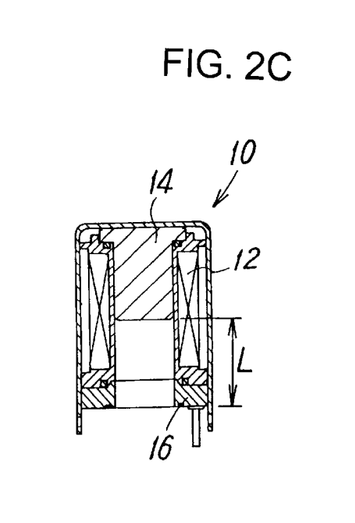

As steps for assembling the solenoid portion 10, as shown in FIG. 2, constituent elements of the solenoid portion 10 is set on a work stand 30. The work stand 30 has a base portion 31, a first core portion 32 which is provided at a center of the base portion in a standing manner to match with an inner diameter of the magnetic case 11, and a second core portion 33 which is provided at a center of the first core portion 32 to match with an inner diameter of the central hole penetrating the bobbin 13 and the magnetic plate 16, and the length of the second core portion 33 is formed in a length L defining an end face of the fixed iron core 14 (the fixed magnetic pole member) inserted into the central hole of the bobbin, or the magnetic pole face, and a face of the magnetic plate 16 positioned on the opening side of the magnetic case 11.

Next, the magnetic plate 16, the bobbin 13, the fixed iron core 14 and the magnetic case 11 are set on the work stand 30 by fitting the second core portion 33 into the central hole of the magnetic plate 16 and placing the magnetic plate 16 on an upper face of the first core portion 32, by fitting the central hole of the bobbin 13 on the second core portion 33 and placing the bobbin 13 on the magnetic plate 16 and causing an end face of the fixed iron core 14 inserted into the central hole abut on a top face of the second core portion 33 like the above, and finally by fitting the opening portion of the magnetic case 11 to the first core portion 32 so as to align therewith (refer to FIG. 2(a)).

Then, an outer face of the end face of the magnetic case 11 is pressed by means of a pressing member 40 and an end face of the fixed iron core 14 is pressed against a top face of the second core portion 33 so that the magnetic plate 16 is positioned accurately relative to the magnetic case 11 such that the distance between the end face of the fixed iron core 14 and the a face of the magnetic plate 16 positioned on the side of the opening of the magnetic case 11 becomes the L in a state where the fixed iron core 14 has been brought into contact the inner end of the magnetic case 11 in a pressed manner. At that position, an outer periphery of the magnetic plate 16 is fixed to the side wall of the magnetic case 11 by such means as welding or the like (refer to FIG. 2(b)), and the solenoid portion 10 (refer to FIG. 2(c)) is completed via these steps.

In this manner, in assembling the solenoid portion 10, the distance between the end face of the fixed iron core 14 and the face of the magnetic plate 16 positioned on the opening side of the magnetic case 11 can be maintained at the defined value L accurately. Thereby, variations in the distance L can be suppressed, so that, even when the movable iron core 15 is attracted to the end face of the fixed iron core 14 and the stopper 17 abuts on the magnetic plate 16, a position relationship between the end face of the fixed iron core 14 in the central hole and the end face of the movable iron core 15 can be maintained properly.

Further, the valve portion 20 will be explained in detail with reference to FIG. 1(a). The valve portion 20 comprises a valve body 21 with a generally rectangular cross-sectional shape formed therein with an input port P, an output port A, a discharge port R and a valve chamber 21a which causes these ports to communicate with one another mutually, a movable orifice 26 and a poppet valve 23 accommodated in the valve chamber 21a, and a push rod 22 which is coupled to the poppet valve 23 and which is pressed by the movable iron core 15.

The movable orifice 26 is constituted by a supply valve seat 25 which approaches to/separates from the poppet valve 23 to open/close the valve chamber 21a and a pipe passage 26a which causes the input port P and the supply valve seat 25 to communicate with each other and which provides a first acting face 26b and a second acting face 26c for causing the fluid pressure from the input port P in a direction of the poppet valve 23 and in a direction opposed thereto, and the movable orifice is provided in the valve chamber 21a so as to be movable slidably in directions of approaching to/separating from the poppet valve 23. Incidentally, the first acting face 26b has a fluid pressure acting area larger than that of the second acting face 26c on which the fluid pressure acts in the opposing direction.

The poppet valve 23 is disposed to be movable between the discharge valve seat 24 formed at a position where the discharge port R communicates with the valve chamber 21a and the supply valve seat 25, and it opens/close the both valves according to operation of the solenoid portion 10.

Incidentally, a poppet spring 23a is confined between the movable orifice 26 and the poppet valve 23. Also, a mouth portion 27 opened in the valve body 21 for inserting the movable orifice 26, the poppet valve 23 and the like in the valve chamber 21a is closed by a bush 28 attached on its periphery with a seal member 29 in an air-tight manner.

In an electromagnetic valve obtained by coupling the solenoid portion 10 and the valve portion 20 having such structures to each other, when the solenoid portion 10 is put in a de-excited state, as shown on the left half in FIG. 1(a), the movable iron core 15 presses the poppet valve 23 on the supply valve seat 25 via the push rod 22 to open the discharge valve seat 24, 50 that the output port A is caused to communicate with the discharge port R via the valve chamber 21a, and the discharge valve seat 24 and the output port A and the valve chamber 21a become the atmospheric pressure. Also, the fluid pressure of fluid supplied from the input port P acts on the both acting faces 26b, 26c of the pipe passage 26a and the movable orifice 26 slides in the direction of the poppet valve 23 due to a differential pressure between pressures on both the faces to cause the supply valve seat 15a to approach to the poppet valve 23. That is, the poppet valve 23 and the movable orifice 23 approach to each other to close the supply valve seat 15a.

On the other hand, when the solenoid portion 10 is excited, as shown on the right half in FIG. 1(a), pressing of the movable iron core 15 to the poppet valve 23 is released and the poppet valve 23 is separated from the supply valve seat 25 by the biasing force of the poppet spring 23a to seat on the discharge valve 24. Thereby, the discharge port P and the valve chamber 21a are disconnected from each other, and the output port A communicates with the input port P via the valve chamber 21a, the supply valve seat 25 and the pipe passage 26a so that the pressure in the valve chamber 21a is increased. Therefore, the movable orifice 15 is pushed back in a direction of separating from the poppet valve 23 so that supply valve seat 15a is opened more widely.

Now, a coupling structure of the valve portion 20 and the solenoid portion 10 will be explained in detail with reference to FIGS. 1(a) to 1(c), FIG. 3 and FIG. 4. The valve portion 20 and the solenoid portion 10 are coupled to each other by fitting to the opening of the magnetic case 11 formed in the generally rectangular cross-sectional shape one end side of the valve body 21 formed in the generally rectangular cross-sectional shape like this, from which the push rod 22 projects and caulking pieces 11b provided on the side wall of the magnetic case 11 which is positioned on the opening side to recessed portions 21b provided on at least one pair of opposing side faces of the valve body 21 which is positioned on the one end side.

Figure 3:
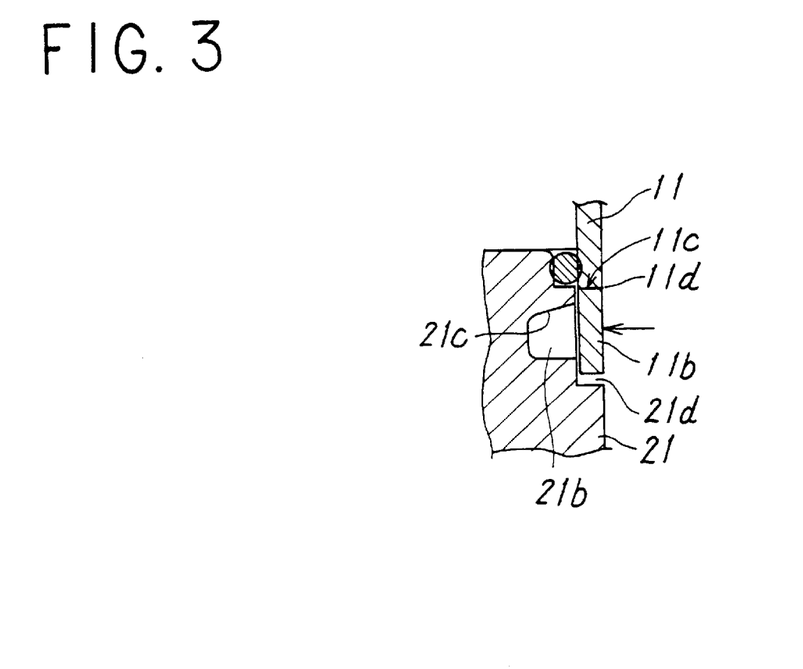
FIG. 3 is an enlarged partial sectional view for explaining a coupling method of a valve portion and a solenoid portion effected by caulking in the first embodiment of the electromagnetic valve according to the present invention.

Here, the recessed portion 21b has a sectional shape such as shown in FIG. 1(c) and FIG. 3, namely, an inner wall face 21c positioned on the one end side of the valve body 21 is formed by an inclining face inclining in a direction of the bottom of the recessed portion 21b towards the other end side of the valve body 21, and the section of the recessed portion 21b is entirely formed in a generally trapezoidal shape and a stepped portion 21d is formed on the other end side of the recessed portion 21b. On the other hand, as shown in FIG. 1(b), the valve body 21 is fitted to the magnetic case 11, U-shaped cuttings 11a opened to the opening end side of the side wall are provided at positions of the magnetic case 11 corresponding to the recessed portions 21b of the side wall, and the cuttings 11a, namely, regions which are each surrounded by a first cutting line 1d generally parallel to the opening end of the side wall and two second cutting lines 11e provided from both ends of the first cutting line towards the opening end generally perpendicularly thereto form the caulking pieces 11b. Incidentally, a region surrounded by the caulking piece 11b and the opening end of the side wall is supported by the stepped portion 21d of the valve body 21.

Figure 4:
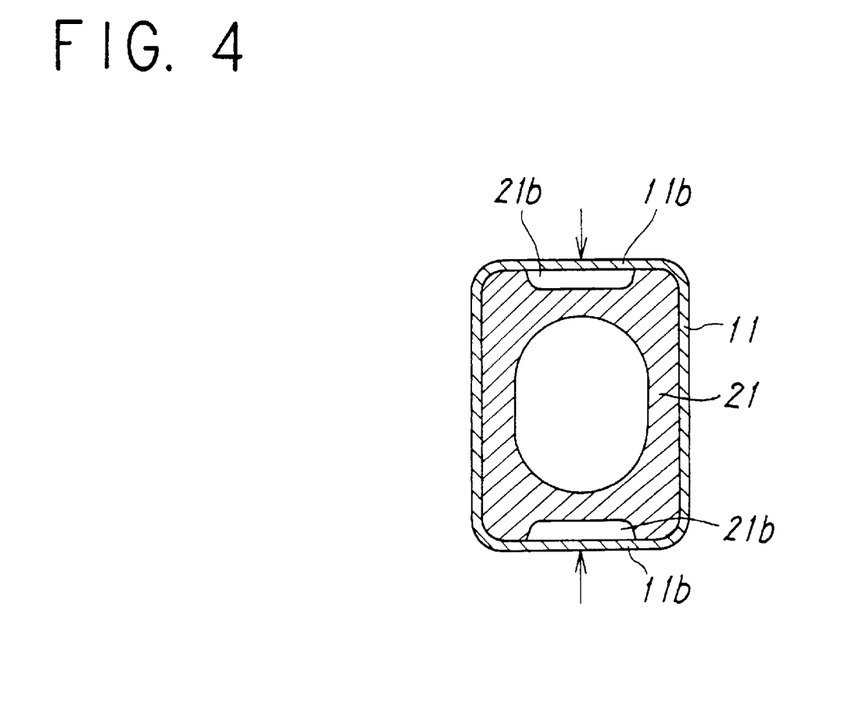
FIG. 4 is a cross-sectional view for explaining the coupling method of the valve portion and the solenoid portion effected by caulking in the first embodiment of the electromagnetic valve according to the present invention.

As shown in FIG. 3 and FIG. 4, when the valve body 21 is fitted to the opening of the magnetic case 11 and the opposing caulking pieces 11b are respectively pushed from the outside towards the recessed portions 21b in a state where the opening ends of the side wall have been supported to the stepped portions 21d, as shown in FIG. 1(c), inner side corner portions of cutting faces 11c of the caulking pieces 1b provided by the first cutting lines 11d abut on the inclined inner wall faces 21c of the recessed portions 21b and the caulking pieces 11b is bent outward, so that the inner face side corner portions of the cutting faces 11c and/or portions of the inner faces of the caulking pieces 11b contiguous thereto push the inner wall faces 21c while being deformed plastically. That is, since the pressing force acts to the inner wall face 21c in a direction in which the magnetic case 11 is fitted to the valve body 21, and the pressing force is maintained by plastic deformation of the caulking pieces 11b, a sufficient coupling strength between the solenoid portion and the valve portion can eventually be held.

Figure 5A:
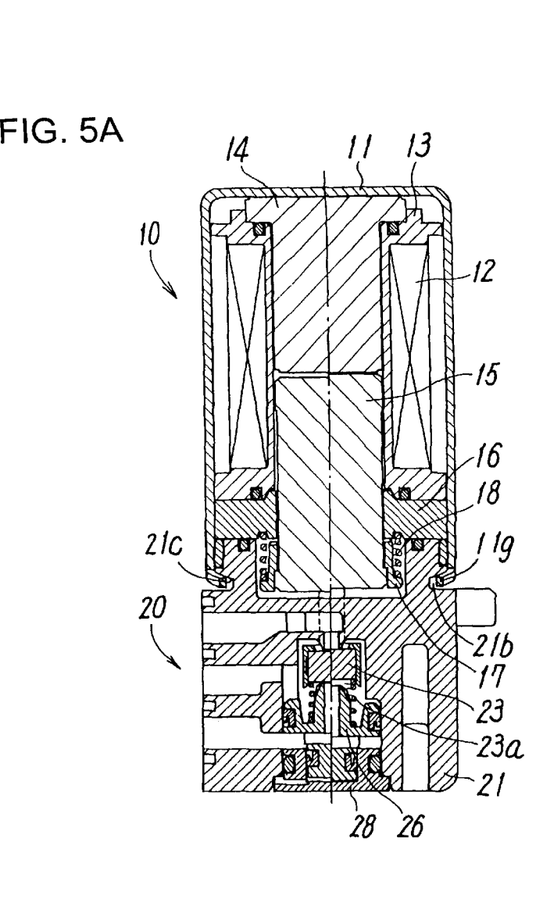
FIGS. 5(a) to 5(c) show a second embodiment of an electromagnetic valve according to the present invention, FIG. 5(a) being a longitudinal sectional view on which a left half shows a state at a time of de-excitation to a coil and a right half shows a state at a time of excitation to the coil, FIG. 5(b) being a side view and FIG. 5(c) being a cross-sectional view taken along line I—I.
Figures 5B, 5C:
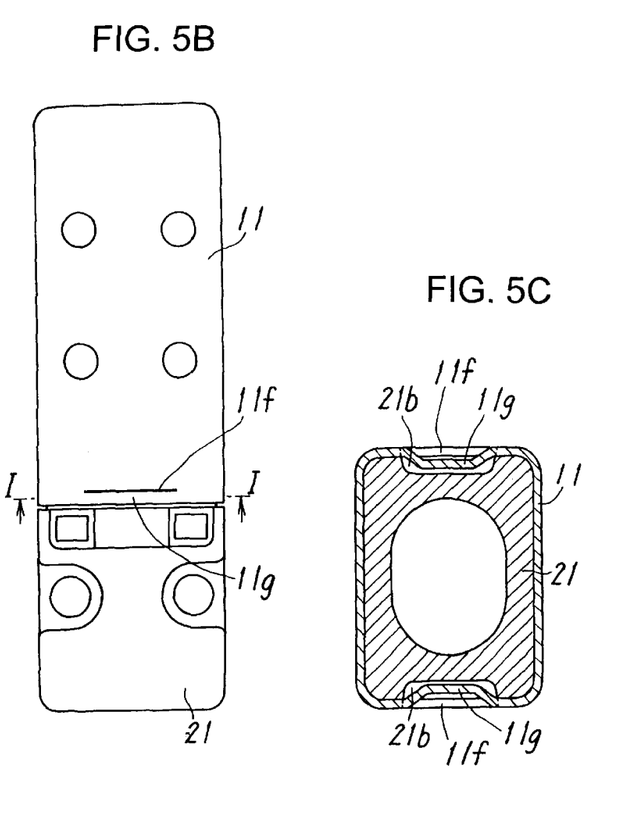

FIGS. 5(a) to 5(c) show a second embodiment of an electromagnetic valve according to the present invention, where straight line cuttings 11f which are generally parallel with the opening end of the side wall are provided at positions corresponding to the recessed portions 21b in the side wall of the magnetic case 11 when the valve body 21 is fitted to the magnetic case 11, and regions positioned between the cuttings 11f and the opening end of the side wall form caulking pieces 11g.

Then, when the valve body 21 is fitted into the opening of the magnetic case 11 and the opposing caulking pieces 11g are respectively pressed towards the recessed portions 21b from the outside, like the case of the first embodiment, the inner side corner portions of the cutting faces of the caulking pieces 11g provided by the cuttings 11f abut on the inclined inner wall faces 21c of the recessed portions 21b and the caulking pieces 11g are bent outward, so that the caulking pieces 11g are entirely pressed into the recessed portions 21b while being plastically deformed. Then, the inner side corner portions of the cutting faces and/or one portion of the inner faces of the caulking pieces 11g contiguous thereto press the inner wall faces 21c. Accordingly, an effect similar to that in the first embodiment can eventually be achieved.

Incidentally, the other structure and operation of the electromagnetic valve of the second embodiment are the same as those in the first embodiment, so explanation thereof will be omitted for avoiding duplication.

Figure 6A:
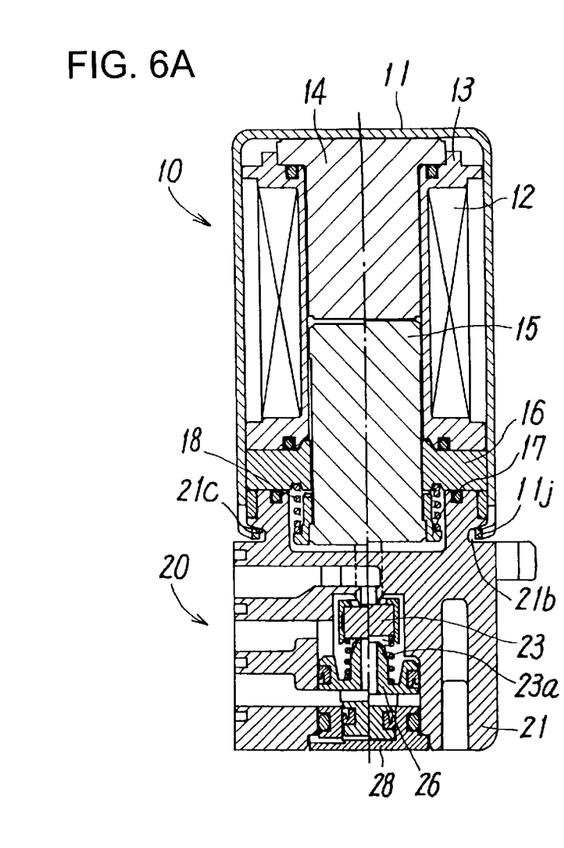
FIGS. 6(a) to 6(c) show a third embodiment of an electromagnetic valve according to the present invention, FIG. 6(a) being a longitudinal sectional view on which a left half shows a state at a time of de-excitation to a coil and a right half shows a state at a time of excitation to the coil, FIG. 6(b) being a partial sectional side view and FIG. 6(c) being a cross-sectional view taken along line II—II.
Figure 6B:
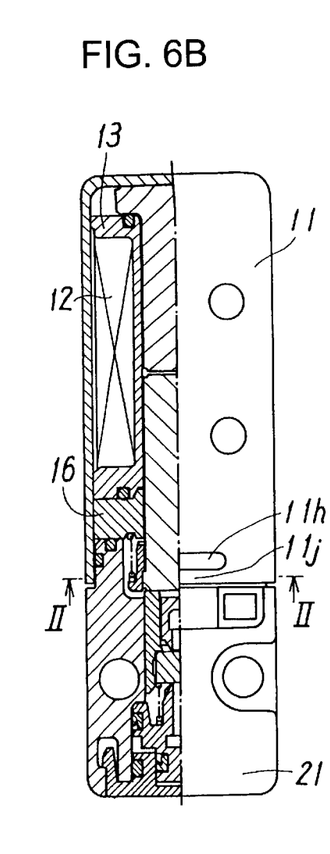
Figure 6C:
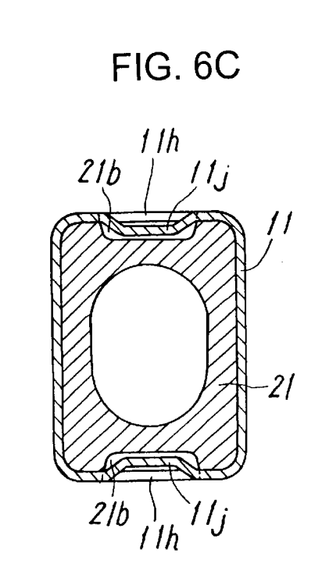

FIGS. 6(a) to 6(c) show a third embodiment of an electromagnetic valve according to the present invention, where straight line cuttings 11h, each comprising a thin hole generally parallel with the opening end of the side wall, are generally parallel with the opening end of the side wall are provided at positions corresponding to the recessed portions 21b in the side wall of the magnetic case 11 when the valve body 21 is fitted to the magnetic case 11, and regions positioned between the cuttings 11h and the opening end of the side wall form caulking pieces 11j.

Then, when the valve body 21 is fitted into the opening of the magnetic case 11 and the opposing caulking pieces 11j are respectively pressed towards the recessed portions 21b from the outside, like the case of the first embodiment, the inner side corner portions of the cutting faces of the caulking pieces 11j abut on the inclined inner wall faces 21c of the recessed portions 21b and the caulking pieces 11j are bent outward, so that the caulking pieces 11j are entirely pressed into the recessed portions 21b while being plastically deformed. Then, the inner side corner portions of the cutting faces and/or one portion of the inner faces of the caulking pieces 11j contiguous thereto press the inner wall faces 21c. Accordingly, an effect similar to that in the first embodiment can eventually be achieved.

Incidentally, the other structure and operation of the electromagnetic valve of the third embodiment are the same as those in the first embodiment, so explanation thereof will be omitted for avoiding duplication.

Incidentally, in the above embodiments, the magnetic case 11 is opened at its one end and it is closed at the other end by the end wall formed integrally with the side wall, but such a constitution can be employed that an opening is also provided on the other end and the opening is closed by a bottom lid made of ferromagnetic material. The cross-sectional shape of the magnetic case 11 is not limited to the generally rectangular shape but it may be a proper shape such as a circular shape. Also, the movable iron core and the fixed iron core have been formed of an elliptic column with a cross-section of an almost ellipse. At this time, the shape of the central hole is also a shape matching with the sectional shape of each iron core, of course. Furthermore, in the above embodiments, the fixed iron core serving as the fixed magnetic pole member has been fitted and fixed in the central hole, but the fixed magnetic pole member is not provided with the iron core portion fitted into the central hole necessarily, and it may be a plate-shaped one closing the end portion of the central hole.

As understood from the above, according to the electromagnetic valve according to the present invention, the recessed portions which are positioned on one end side of the valve body and whose inner wall faces formed by the inclining faces which incline from the one end side of the valve body to the other end side towards its depth are provided on a valve body side face positioned on one end side of the valve body so as to be opposed to each other, while the cuttings for forming the caulking pieces are provided at positions corresponding to the recessed portions on the side wall positioned on the opening side of the magnetic case, and the valve portion and the solenoid portion are coupled to each other in the state where they have been biased in directions in which they are fitted to each other by causing the caulking pieces to abut on the inclining faces of the recessed portions to caulk them in the recessed portions, so that a high coupling strength between the valve portion and the solenoid portion can be secured simply at a low cost without large-sizing the solenoid portion.

What is claimed is:

1. An electromagnetic valve which comprises a solenoid portion where a movable iron core driven by excitation operation to a coil is provided in a magnetic case having an opening at one end and a valve portion where a valve body which is driven by the movable iron core to switch flow paths among a plurality of ports is provided in a valve body, and where the solenoid portion and the movable iron core are coupled to each other by fitting one end side of the valve body into the opening of the magnetic case, characterized in that recessed portions for engagement are provided on opposing side faces of the valve body on the side of a connection end side of the valve body with the solenoid portion, and inner wall faces of the recessed portions on the side of the solenoid portion are formed in inclining faces from the solenoid portion side to the other end side thereof towards a depth direction, and on the other hand, cuttings applied for forming caulking pieces are formed on a side wall of the magnetic case positioned on the side of the opening at positions corresponding to the recessed portions, and the valve portion and the solenoid portion are coupled to each other in a state that the valve portion and the solenoid portion have been biased in a direction in which they are fitted to each other by causing the caulking pieces to abut on the inclining faces of the recessed portions to caulk the caulking pieces into the recessed portions.

2. An electromagnetic valve according to claim 1, characterized in that the solenoid portion is constituted by positioning a magnetic plate to the magnetic case such that a distance between a magnetic pole face of a fixed magnetic pole member which attracts the movable iron core by a magnetic force which is formed in the magnetic case and a face of a magnetic plate which is positioned on the side of the opening of the magnetic case is fixed, and fixing the magnetic plate to the side wall of the magnetic case.

3. An electromagnetic valve according to claim 1 or 2, characterized in that the cuttings provided on the side wall of the magnetic case is each formed in a U-shape opened to the side of the opening end of the side wall, and regions surrounded by the cuttings with the U-shape are caulked into the recessed portions as the caulking pieces.

4. An electromagnetic valve according to claim 1 or 2, characterized in that the cuttings provided on the side wall of the magnetic case are each formed in a straight line shape parallel to the opening end of the side wall, and regions positioned between the cuttings with the straight line shape and the opening end of the magnetic case are caulked into the recessed portions as the caulking pieces.

5. An electromagnetic valve according to claim 1 or 2, characterized in that the cuttings provided on the side wall of the magnetic case are thin holes bored in parallel with the opening end of the side wall, and regions positioned by the thin holes and the opening end of the magnetic case are caulked into the recessed portions as the caulking pieces.

* * * * *

UNITED STATES PATENT AND TRADEMARK OFFICE
CERTIFICATE OF CORRECTION

PATENT NO. : 6,745,790 B1
DATED : June 8, 2004
INVENTOR(S) : Sato et al.

It is certified that error appears in the above-identified patent and that said Letters Patent is hereby corrected as shown below:

<u>Title page,</u>
Item [75], the first Inventor's name is incorrect. Item [75] should read:

-- [75] Inventors: Hideharu Sato, Tsukuba-gun (JP);
                     Yoshio Aso, Tsukuba-gun (JP);
                     Shinichi Yoshimura, Tsukuba-gun (JP);
                     Takumi Matsumoto, Tsukuba-gun (JP); --

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,745,790 B1
DATED : June 8, 2004
INVENTOR(S) : Sato et al.

Page 1 of 1

It is certified that error appears in the above-identified patent and that said Letters Patent is hereby corrected as shown below:

<u>Title page,</u>
Item [75], the first Inventor's name is incorrect. Item [75] should read:

-- [75] Inventors: Hideharu Sato, Tsukuba-gun (JP);
                      Yoshio Aso, Tsukuba-gun (JP);
                      Shinichi Yoshimura, Tsukuba-gun (JP);
                      Takumi Matsumoto, Tsukuba-gun (JP) --

Signed and Sealed this

Fourteenth Day of September, 2004

JON W. DUDAS
*Director of the United States Patent and Trademark Office*